June 30, 1970 — J. R. HURSCH ET AL — 3,517,605
BUN TOASTER
Filed Sept. 6, 1968 — 2 Sheets-Sheet 1
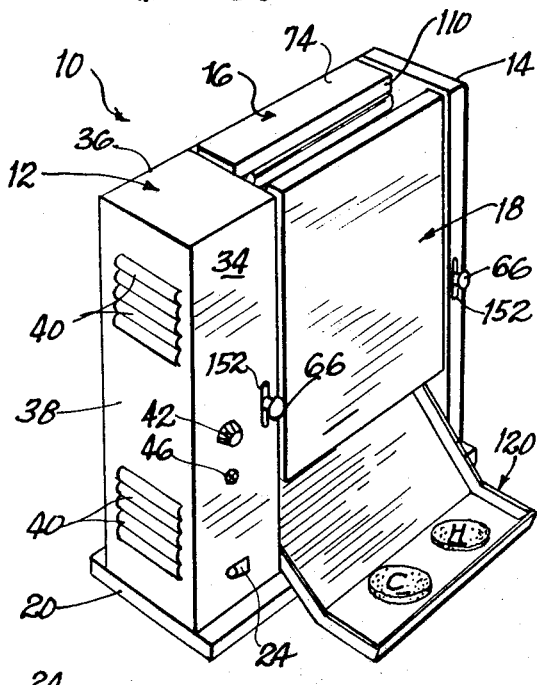
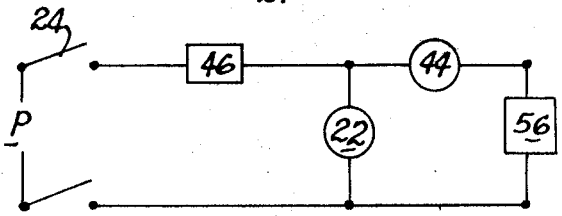
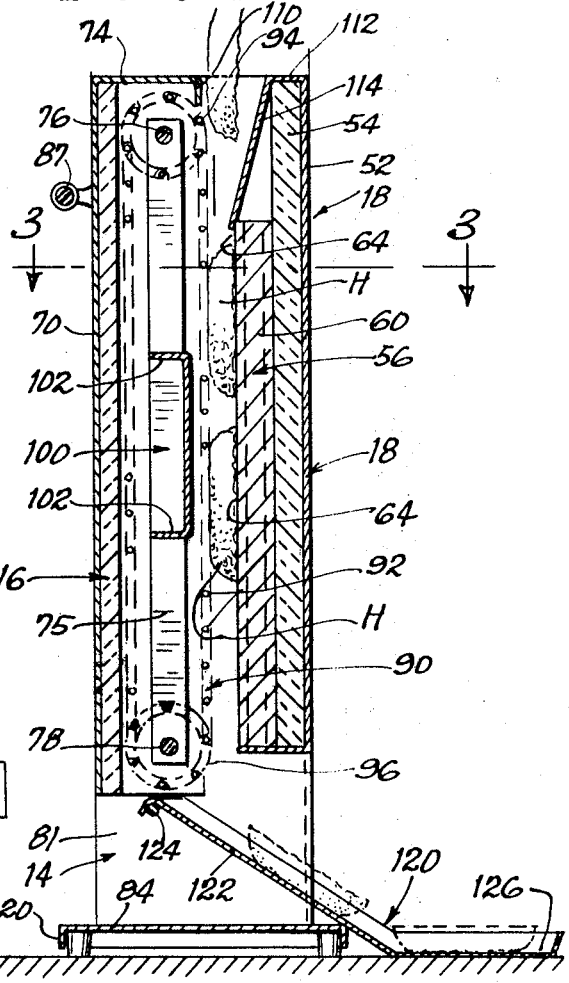
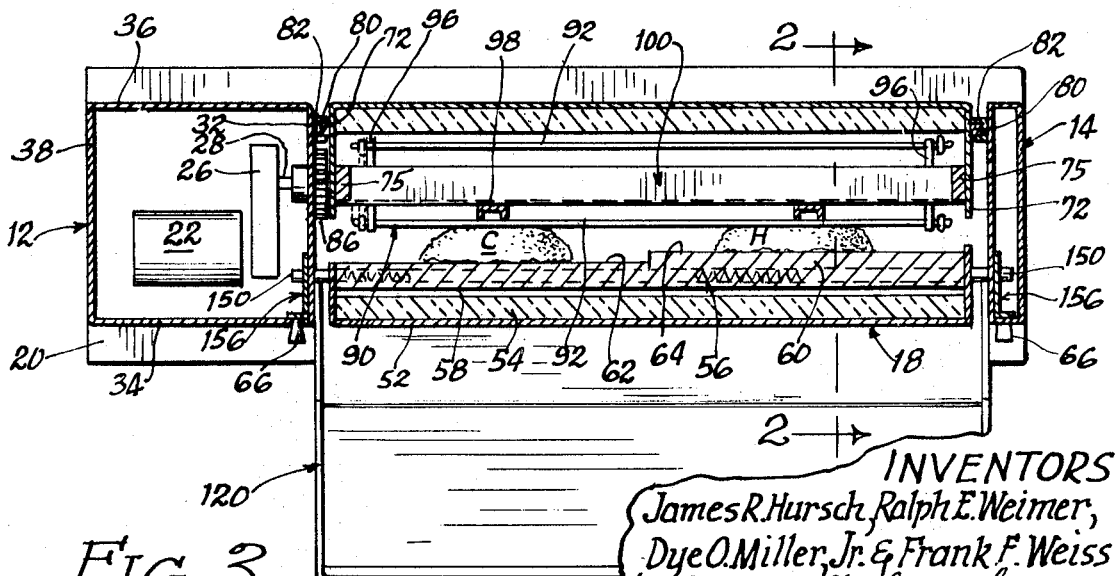
INVENTORS
James R. Hursch, Ralph E. Weimer,
Dye O. Miller, Jr. & Frank F. Weiss
by Dressler, Goldsmith,
Clement & Gordon Attys

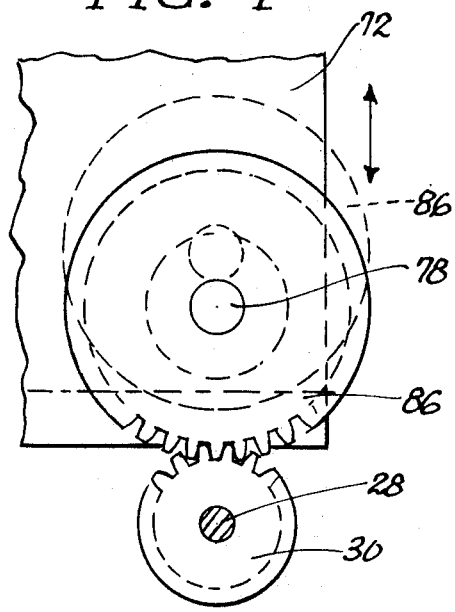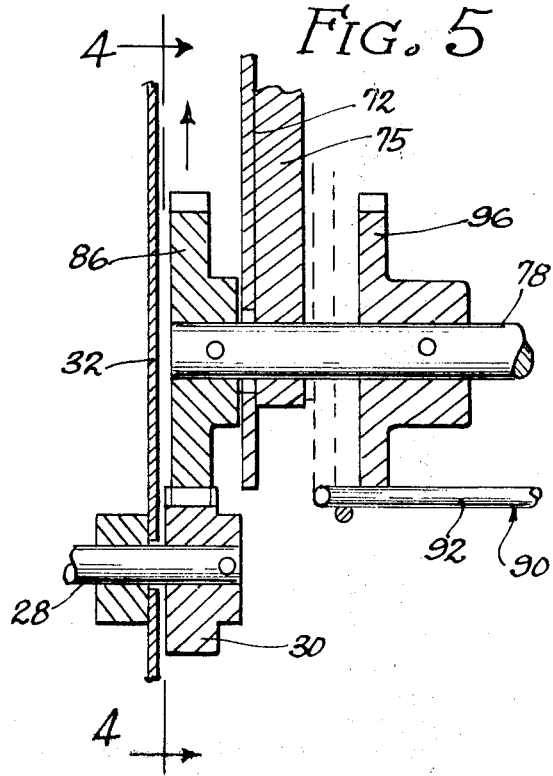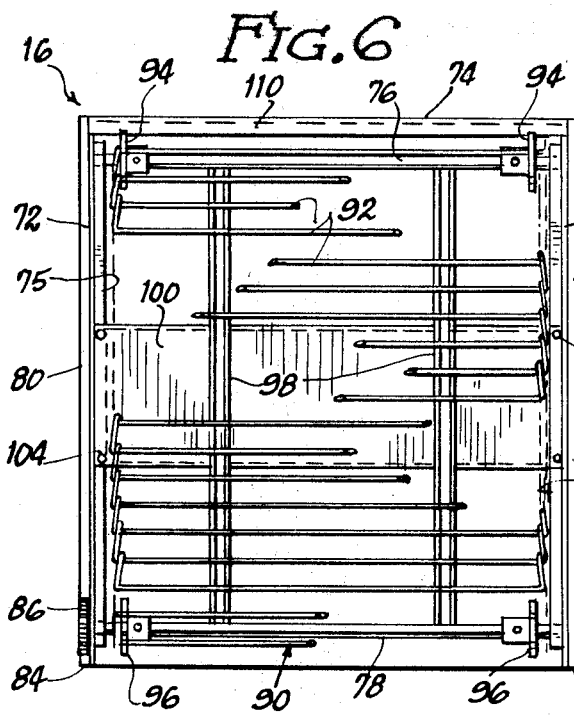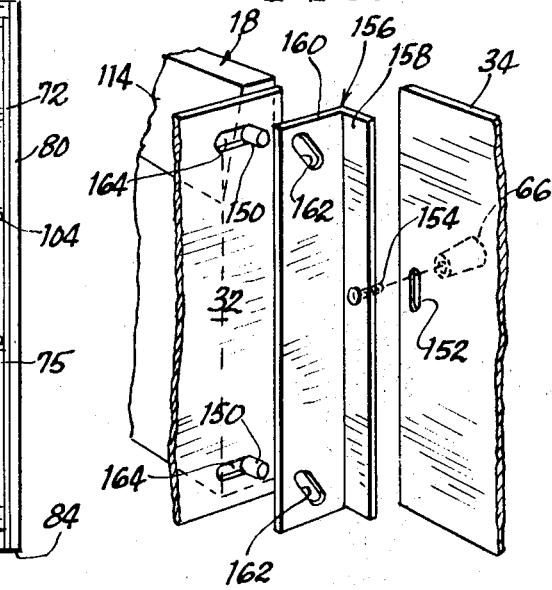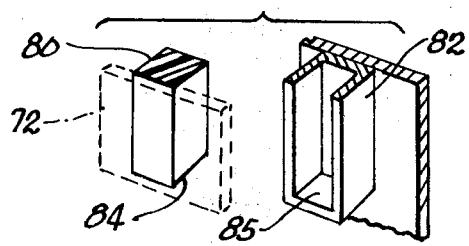

United States Patent Office 3,517,605
Patented June 30, 1970

3,517,605
BUN TOASTER
James R. Hursch, Addison, Ralph E. Weimer, Lombard, Dye O. Miller, Jr., Mount Prospect, and Frank F. Weiss, Park Ridge, Ill., assignors to McDonald's System, Inc., a corporation of Illinois
Filed Sept. 6, 1968, Ser. No. 757,931
Int. Cl. A47j 37/08
U.S. Cl. 99—423                                    13 Claims

ABSTRACT OF THE DISCLOSURE

A compact and easily cleaned bun toaster such as for the heels and crowns of hamburger buns and the like. A conveyor confronts a toasting platen for driving buns along the surface of the conveyor to toast them. The conveyor is removable as a unit from the frame mounting the platen, thereby to expose both the conveyor and the platen for easy cleaning. The platen is movable toward and away from the conveyor to adjust the space therebetween. The platen is stepped to facilitate simultaneous toasting of bun heels and crowns of different thicknesses. The conveyor is in driven engagement only when moved into suspended engagement with the frame.

---

This invention relates to toasters, such as bun toasters, in which it is desirable to toast a single one of two surfaces of the item to be toasted quickly and easily. Toasted bun halves and the like are then used in making sandwiches, such as hamburger sandwiches, roast beef sandwiches, etc.

In the past bun halves have been toasted on grills and on complex and large bun toasters such as those of the types illustrated in U.S. Pats. 2,225,068, 2,703,521, 3,033,099 and 3,126,813.

In accordance with this invention, a very compact and very easily cleaned bun toaster has been developed. The toaster occupies a minimum of space while producing a very large quantity of properly and uniformly toasted bun halves. Further, the toaster of this invention is easily disassembled by a simple sliding removal of a conveyor assembly thereby exposing both the conveyor assembly and the toasting surfaces for cleaning.

To accommodate buns of differing thicknesses and to provide the proper slight compression of the bun halves between the confronting conveyor and toasting surfaces, means for adjusting the space between those confronting surfaces are provided. Thus that spacing may be rapidly and positively adjusted as needed and desired, preferably by an adjusting movement of the toasting surface toward and away from the conveyor surface.

Further, in accordance with this invention, means for simultaneously toasting bun halves of different thicknesses are provided. It is usually the case that the crown of a bun half is substantially thicker than the heel. To toast both at the same time in known bun toasters usually requires an elaborate system such as of weighted pressure members or an undesirably high pressure aaginst the crowns. Alternatively horizontally oriented or slightly inclined units have been used to overcome this problem.

The vertically oriented bun toaster described herein comprises a heating platen having side by side offset platen sections, the surfaces of which are spaced apart different distances from the confronting conveyor, the different distances being approximately the usual difference in the thickness of bun heels and bun crowns. Via that construction, bun heels and crowns may be compressed generally uniformly to enable a single conveyor to convey both simultaneously through a vertically oriented bun toaster.

The conveyor assembly of the bun toaster of this invention is removable as a unit for ease of cleaning and repair, a feature which is quite important in food treating equipment. The drive means for the conveyor is sanitarily enclosed except for a single drive member which projects into the path of the conveyor assembly when it is slidably seated in the bun toaster assembly. The conveyor assembly carries a complementary drive member which is guided into driven engagement with the drive member as the conveyor assembly is moved into seated engagement within the bun tosater. Thus a self-coupling and freely uncoupleable driving means is provided for the conveyor, thereby facilitating the ready and easy removability of the conveyor assembly from the bun toaster.

Further advantages and attributes of this invention will become apparent from the following detailed description of a presently preferred embodiment of this invention and the appended drawings of which:

FIG. 1 is a front perspective view of a bun toaster of this invention;

FIG. 2 is a vertical sectional view of the bun toaster of FIG. 1 taken substantially along the line 2—2 of FIG. 3;

FIG. 3 is a horizontal sectional view of the bun toaster of FIG. 1 taken substantially along the line 3—3 of FIG. 2;

FIG. 4 is a fragmentary side elevational view, partly in section, taken substantially along line 4—4 of FIG. 5;

FIG. 5 is a fragmentary view of a portion of the drive mechanism of FIG. 1;

FIG. 6 is a front elevational view of the conveyor section having been slidably removed from the bun toaster of FIG. 1;

FIG. 7 is an exploded perspective view of a portion of the platen assembly adjustment mechanism of FIG. 1;

FIG. 8 is a fragmentary exploded perspective view of a portion of FIG. 1; and

FIG. 9 is a schematic diagram of the circuitry of FIG. 1.

First referring to FIG. 1, a bun toaster constructed in accordance with this invention comprises a toaster assembly 10 including a compartment 12, a support column 14, a vertical conveyor section 16 and a vertical platen assembly 18. Compartment 12 and support column 14 are rigidly connected to pedestal 20 and together therewith constitute a frame for the conveyor section 16 and platen assembly 18, which frame is adapted to be supported on a horizontal surface.

Compartment 12 sanitarily encloses and houses an electric drive motor 22 connected to a suitable source of power P which may be turned on and off by a conventional switch 24. Drive motor 22 is mechanically coupled to a suitable reducing gear box 26 which drives a shaft 28 mounting a suitable drive member such as drive gear 30 (see FIG. 4) which is conventionally journalled in side wall 32 of compartment 12. Motor 22 may be a variable speed motor whereby the speed of the conveyor to be described may be adjusted to vary toasting time. Compartment 12, in addition to side wall 32 comprises front and rear walls 34 and 36, respectively, and vent wall 38 which desirably is provided with a plurality of ventilation openings such as louvers 40.

Front wall 34 mounts a control knob 42 for a thermostat 44, the above-mentioned switch 24 and a pilot light 46 which visually indicates when the toaster is in operation. Side wall 32 and support column 14 may be lined with a heat insulating layer (not shown) if desired.

Platen assembly 18 comprises an outer panel 52 of pan shape, an insulating layer 54 and an expansive platen 56. Platen 56 preferably comprises a pair of side-by-side vertical sections stepped with respect to each other. The sections intersect along a vertically oriented line which, as will appear, is parallel to the direction of movement of the buns to be toasted. Thus section 58 is spaced further from the conveyor of the conveyor section 16 than is section 60. As will appear, the offset or stepping provides for the toasting of bun halves (such as crowns and heels) and the like which are of different thicknesses (see FIG. 3).

Platen 56 may comprise conventional platen sections having electric resistance elements embedded therein for heating the platen section toasting surfaces 62 and 64, respectively. Preferably the toasting or heating surfaces themselves are treated with a non-stick coating such as a high temperature resistant formulation of polytetrafluoroethylene, or the like.

Platen assembly 18 is adjustably mounted on the frame and more particularly via compartment 12 and support column 14. As best seen in FIG. 7, platen assembly 18 is adjustable toward and away from conveyor section 16 via adjustment knobs 66. The right-hand and left-hand knobs 66 (as seen in FIG. 1) may be utilized together to adjust the spacing between conveyor section 16 and the respective confronting parallel surfaces 62 and 64 of sections 58 and 60.

Each of the sides of the platen assembly 18 mount a pair of spaced members such as pins 150 immovably fixed thereto. These pairs of pins 150 project, respectively toward and into the compartment 12 and support column 14 of the frame and are identically adjustably cooperable with the compartment and support column. Hence only one vertical pair of pins will be described in conjunction with FIG. 7 which is an exploded perspective view as viewed from within compartment 12.

Front wall 34 of compartment 12 is provided with a vertically oriented elongate slot 152. Through this slot a threaded stud 154 projects. Stud 154 is threadedly received by knob 66 at the end thereof that projects through slot 152. The other end of stud 154 is secured as by welding to a right angle member 156. Right angle member 156 comprises arm 158 (to which stud 154 is connected) and a web 160.

Web 160 defines a pair of slots 162 disposed substantially at angles of approximately 45° to the line defined by the intersection of the planar surfaces of arm 158 and web 160. Slots 162 are further proportioned to slidably receive pins 150. Pins 150 also project through horizontal slots 164 and are slidably received therein.

To move the platen assembly 18 (hence the heating surfaces) closer to the conveyor section while maintaining the confronting parallel relationship of the toasting surfaces and conveyor, threaded knobs 66 are loosened from their normal clamping engagement against front wall 34 (and the complementary front wall of column support 14). Stud 154 is then free to be slidably moved down (or up) within slot 152. As stud 154 is moved downwardly, connected right angle member 156 also moves downwardly. Pins 150 which are captive within slots 162 are then cammed by slots 162 from a lower portion to a higher portion of slots 162. The camming action of slots 162 is translated into a horizontal movement of pins 150 because they are also captive within horizontal slots 164. Thus the camming of pins 150 by angled slots 162 as stud 154 moves downwardly causes pins 150 to move rearwardly carrying the interconnected platen assembly (and the toasting surfaces) rearwardly toward conveyor section 16. When the proper spacing of the platen assembly and conveyor section is achieved, knobs 66 are threadedly drawn toward the compartment front wall 34 (and the complementary column support front wall) to clamp front wall 34 between arm 158 and knob 66, thereby to fix the adjusted position of the platen assembly and the associated platen toasting surfaces. Movement of the toasting surfaces away from the conveyor assembly is accomplished in the reverse fashion.

Now referring more particularly to FIGS. 2, 3 and 6, the freely removable conveyor section 16 comprises an open box-like frame having a back 70, sides 72 and a top 74. Sides 72 have elongated bars 75 which rotatably journal a pair of shafts comprising upper idler shaft 76 and lower drive shaft 78. A typical suitable journal is illustrated in FIG. 5.

Each of the sides 72 is provided with an externally mounted guide member such as key bar 80 which may be made of a high-temperature reistant nylon. Key bars 80 are slidably receivable in complementary guide means such as keyways 82 which are secured, respectively, to opposed walls 32 and 81 of compartment 12 and column support 14, respectively. As seen in FIGS. 3 and 8, key bars 80 are matingly received within keyways 82 to slidably mount and engage the conveyor section within the toaster assembly 10 and to fixedly position the conveyor section in confronting relation to platen assembly 18 and heating surfaces 62 and 64 thereof. Only when the freely removable conveyor section 16 is positioned in its seated engagement with the frame as seen in FIGS. 2 and 8 (its downward movement in the keyways being arrested by the lower edge 84 of key bar 80 contacting seat 85 closing the bottom of keyways 82), is the self-coupling driving means including the driven gear, i.e., conveyor drive gear 86 positioned to be driven by drive gear 30 (see FIGS. 4 and 5). When, as will be explained, the conveyor section is removed for cleaning or the like, conveyor drive gear 86 is freely uncoupled and disengaged from meshing engagement with drive gear 30 simply by lifting the conveyor section by handle 87 as illustrated in phantom in FIG. 4.

Conveyor 90 comprises a plurality of rods 92 having bent and looped ends interlocked with the next preceding rod thereby to form a continuous web (so to speak) of equally spaced horizontally oriented rods which move in a direction normal to the axes of the rods and parallel to the heating surfaces. The rods 92 engage idler shaft sprockets 94 which are spaced apart along and corotatably mounted on upper idler shaft 76 thereby to permit conveyor 90 to move freely upwardly, over shaft 76 and then downwardly to confront heating surfaces 62 and 64. As previously stated, the lower drive shaft 78 is driven via conveyor drive gear 86. Shaft 78 corotatably mounts a further pair of spaced apart drive sprockets 96 which engage rods 92 thereby to drive the rods, hence conveyor 90.

Because rods 92 are relatively flexible and to assure firm, consistent contact between buns to be toasted and the heating surfaces, conveyor section 16 further comprises a pair of vertical back-up ribs 98 which contact rods 92 at a position confronting the platen sections. These ribs 98 terminate top and bottom just below the point at which the rods pass around the sprockets thereby not to interfere with the conveyor. The back-up ribs are preferably U-shaped channels and are thusly positioned via a connector web 100 which is ribbed as at 102 to provide a strong relatively inflexible mount for ribs 98. Connector web 100 is secured to bars 75 as by suitable bolt means 104 thereby to fixedly position the back-up ribs as shown.

The top of conveyor section 16 and the top of platen assembly 18, as seen in FIG. 2 together define a trough-like means to receive buns to be toasted and to guide them to the confronting toasting surfaces and conveyor. Thus, top 74 of conveyor section 16 terminates in a downwardly extending flange 110. The top 112 of platen assembly 18 terminates in a downwardly and inwardly sloping wall 114 terminating at its lower edge at the top and forward edges of platen 56. When bun portions are dropped into the trough, they are fed to the constricted end of the trough by gravity and are there slightly compressed between the downwardly moving conveyor 90 and the confronting platen section 60. As seen in FIG. 2 the bun portions H (heels) are illustrated. The bun portions are then toasted as they are conveyed by the conveyor downwardly along and against the toasting surfaces, the movement of the conveyor and the conveyed buns being timed so that when the buns drop from the bottom of the conveyor they are properly toasted.

When the bun portions drop they descend by gravity to a removable slide and holding pan 120 which comprises a sloping slide section 122 supported at its top by a rod 124 connected at its ends to compartment 12 and column support 14 and a holding pan 126 which may rest on the same horizontal surface upon which pedestal 20 rests.

Bun portions H constitute the heels of a bun whereas bun portions C comprise the crowns. Because the heels and crowns are most usually of substantially different thicknesses, platen or heating sections 58 and 60 are offset from each other, i.e., spaced apart from the confronting conveyor 90 differently to accommodate the differing thicknesses. Thus, when a bun is to be toasted, the two halves are dropped into the appropriate portion of the trough leading to the top of the conveyor, each then being properly compressed against the respective platen section. As stated previously, adjustment in the spacing between the conveyor and the platen sections is made possible by adjustment knobs 66 and the associated mechanism, thereby to accommodate buns of different thicknesses and bun portions of different thicknesses.

A typical bun toaster made in accordance with this invention and now being marketed is mounted on a pedestal of about one by about eight by about twenty-five inches, and which is about six inches deep, by about twenty-five inches wide by about twenty-four inches high. It is capable of toasting approximately 720 buns (about 1440 bun halves) per hour with the conveyor running at a speed which causes the bun to traverse the length of the twelve inch platen surface in about 30 seconds, the platen surface being maintained at a heating temperature of approximately 430° F. The platen is approximately twelve inches high and about sixteen inches wide. The toaster is exceedingly compact and very importantly is easily assembled and disassembled for cleaning of the toasting and conveying mechanisms.

Still other modifications within the contemplation of this invention will become apparent to those skilled in the art from the foregoing description and drawings. Accordingly it is our intention that the scope of the invention shall be limited only in accordance with the appended claims.

What is claimed is:

1. A bun toaster for buns and the like adapted to be supported on a table or the like comprising a frame, a generally vertically oriented platen assembly having an expansive vertically oriented toasting surface, a freely removable vertically oriented conveyor assembly freely suspended solely on said frame for movement into and out of mounting engagement with said frame, cooperating means on said frame and conveyor assembly for removably supporting said conveyor assembly on said frame, said conveyor assembly mounting a conveyor confronting, spaced from and parallel to said toasting surface and adapted to be driven downwardly to slidingly hold, move and drive buns and the like downwardly against and along said toasting surface, and a self-coupling driving means on said frame and said conveyor assembly for driving said conveyor, said driving means being in driving engagement only when said freely removable conveyor assembly is moved into supported engagement on said frame.

2. In the bun toaster of claim 1 in which said cooperating means comprises guide means on said frame and complementary guide members on said conveyor assembly for sliding engagement with said guide means for slidable mounting engagement of said conveyor assembly with said frame.

3. In the bun toaster of claim 2 in which said driving means comprises a motor and drive gear mounted on said frame and a driven gear rotatably mounted on said conveyor assembly, said driven gear being placed in driven engagement with said drive gear when said conveyor assembly is supported on said frame.

4. In the bun toaster of claim 1 in which said toasting platen assembly is adjustably movable toward and away from said conveyor to adjust the spacing between said conveyor and said toasting surface while maintaining their parallel confronting relationship.

5. The bun toaster of claim 1 in which said expansive toasting surface comprises a pair of integral side by side surface sections, one of said surface sections being spaced closer to said conveyor than the other of said sections.

6. A bun toaster comprising a frame, a platen assembly defining an expansive toasting surface, a freely removable conveyor assembly supported solely on said frame including a conveyor, means on said frame for freely mounting said conveyor assembly to position said conveyor in a confronting, spaced and parallel relation to said toasting surface to hold and slide buns against and along said toasting surface, and means for driving said conveyor to slide buns along said expansive toasting surface between the confronting parallel portions of said conveyor and said toasting surface, said means for driving said conveyor comprising a motor and a drive gear mounted on said frame, a driven gear on said conveyor assembly for driving said conveyor, and said means for mounting said conveyor assembly further guiding said driven gear into meshing engagement with said drive gear when said conveyor assembly is mounted on said frame.

7. In the bun toaster of claim 6 further characterized by handle means on said conveyor assembly for lifting said conveyor assembly out of mounting engagement with said frame.

8. In the bun toaster of claim 6 in which said conveyor assembly mounts back up means positioned parallel to and confronting said toasting surface, said back up means acting against said conveyor to assure firm contact between buns to be toasted and said toasting surface.

9. A bun toaster for buns and the like adapted to be supported on a table or the like, said toaster comprising a frame, a vertically oriented expansive toasting platen assembly, a vertically disposed conveyor assembly suspended on and supported solely on said frame, cooperating means on said frame and said conveyor assembly for supporting said conveyor assembly, said conveyor assembly being freely removable as a unit by lifting same to disengage said cooperating means and including a conveyor, said conveyor being positioned to confront and being spaced from and parallel to said toasting surface to cooperate therewith to toast buns and to drive buns along said toasting surface, a drive shaft mounted on said conveyor assembly for driving said conveyor, a driven gear corotatably mounted on said drive shaft for driving said shaft, a drive motor and drive gear mounted on said frame, said driven gear being in meshing engagement with said drive gear only when said freely removable conveyor assembly is suspended on said frame.

10. The bun toaster of claim 9 further characterized by means for adjusting the space between said conveyor and said toasting surface along the entire confronting toasting toasting surface and conveyor for accommodating buns of varying thicknesses.

11. In the bun toaster of claim 10 in which said platen assembly defines a pair of side by side vertically oriented toasting surface sections intersecting in a line parallel to the direction of movement of the buns, said sections being differently spaced from said conveyor.

12. In the bun toaster of claim 10 in which said adjusting means are operatively connected to said frame and to said platen assembly to adjustably move said platen assembly toward and away from said conveyor while maintaining the parallel confronting relationship of said conveyor and said toasting surface.

13. In the bun toaster of claim 12 in which said platen assembly is supported on said frame by a plurality of members projecting laterally from said platen assembly toward said frame, and said frame mounts movable means receiving said members for camming said projecting members and said platen assembly toward and away from said conveyor assembly.

References Cited

UNITED STATES PATENTS

| | | | |
|---|---|---|---|
| 966,046 | 8/1910 | Noonan | 74—110 XR |
| 1,536,538 | 5/1925 | Stouffer. | |
| 1,538,864 | 5/1925 | Morrison | 99—387 |
| 2,032,272 | 2/1936 | Feltman | 99—386 |
| 2,533,080 | 12/1950 | Alexander | 99—443 |
| 2,788,735 | 4/1957 | Farace | 99—443 |
| 3,190,216 | 6/1965 | Keller. | |
| 3,291,287 | 12/1966 | Rehm | 198—190 |

BILLY J. WILHITE, Primary Examiner

U.S. Cl. X.R.

99—342, 349, 443